United States Patent
Yoshioka et al.

(10) Patent No.: US 9,821,634 B2
(45) Date of Patent: Nov. 21, 2017

(54) MOTOR LOCK DETERMINATION DEVICE

(71) Applicants: Ryo Yoshioka, Miyoshi (JP); Takanori Nakada, Toyota (JP); Tadashi Akiyama, Okazaki (JP); Kashirou Fukami, Toyota (JP); Yuichiro Hirata, Miyoshi (JP)

(72) Inventors: Ryo Yoshioka, Miyoshi (JP); Takanori Nakada, Toyota (JP); Tadashi Akiyama, Okazaki (JP); Kashirou Fukami, Toyota (JP); Yuichiro Hirata, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 14/894,795

(22) PCT Filed: May 7, 2014

(86) PCT No.: PCT/IB2014/000683
§ 371 (c)(1),
(2) Date: Nov. 30, 2015

(87) PCT Pub. No.: WO2014/191801
PCT Pub. Date: Dec. 4, 2014

(65) Prior Publication Data
US 2016/0129755 A1    May 12, 2016

(30) Foreign Application Priority Data
May 30, 2013 (JP) .................................. 2013-114129

(51) Int. Cl.
*B60H 1/00* (2006.01)
*B60H 1/32* (2006.01)

(52) U.S. Cl.
CPC ..... *B60H 1/00978* (2013.01); *B60H 1/00764* (2013.01); *B60H 1/00828* (2013.01); *B60H 1/3225* (2013.01); *B60H 2001/3252* (2013.01)

(58) Field of Classification Search
CPC ............ B60H 1/00978; B60H 1/00764; B60H 1/3225
See application file for complete search history.

(56) References Cited

U.S. PATENT DOCUMENTS

| 6,016,965 A | 1/2000 | Yoshimura et al. |
| 2004/0211203 A1* | 10/2004 | Murase .................. F04B 27/10 62/226 |
| 2008/0055799 A1* | 3/2008 | Serizawa ............... H02H 5/044 361/24 |

FOREIGN PATENT DOCUMENTS

| JP | 11 182244 | 7/1999 |
| JP | 2000 130166 | 5/2000 |
| JP | 2002 205539 | 7/2002 |

OTHER PUBLICATIONS

International Search Report dated Aug. 18, 2014 in PCT/IB14/000683 Filed May 7, 2014.

* cited by examiner

*Primary Examiner* — Yonel Beaulieu
*Assistant Examiner* — Martin A Weeks
(74) *Attorney, Agent, or Firm* — Oblon, McClelland, Maier & Neustadt, L.L.P.

(57) ABSTRACT

In a motor lock determination device (1), a lock determination on an electric motor (7) is performed such that: a first detection value (PI), which is a detection value (P) of a refrigerant pressure sensor (17) during a stop of an electric fan (5), is detected, and a second detection value (P2), which is a detection value (P) of the refrigerant pressure sensor (17) after the electric fan (5) is driven for a first predetermined (Continued)

time ($\Delta \bar{u}$), is detected; when the second detection value (P2) is equal to the first detection value (PI) or more than the first detection value (PI), it is determined that a motor lock occurs; and when the second detection value (P2) is less than the first detection value (PI), it is determined that no motor lock occurs.

16 Claims, 2 Drawing Sheets

MOTOR LOCK DETERMINATION DEVICE

BACKGROUND OF THE INVENTION

1. Field of the Invention

The present invention relates to a motor lock determination device configured to perform a lock determination on an electric motor that drives an electric fan for cooling off refrigerant used in a cooling device provided in a vehicle.

2. Description of Related Art

Japanese Patent Application Publication No. 11-182244 (JP 11-182244 A) describes an electric fan device configured to control an electric motor that drives an electric fan for cooling off refrigerant for an air conditioner. In the electric fan device, when an over current flows to the electric motor, when an ambient temperature of the electric fan reaches a predetermined temperature or more than the predetermined temperature and the over current in the electric motor is eliminated, it is determined that the electric fan is locked due to freezing.

In the device of JP 11-182244 A, it is necessary to determine whether a current flowing, in the electric motor is an over current or not, in a lock determination on the electric fan, so that a current sensor for detecting the current flowing in the electric motor is required.

Further, when the lock determination is performed on the electric fan by use of a detection value of the current sensor as such, control software or a control circuit for controlling a flowing current to the electric motor according to the detection value of the current sensor is required in addition to the current sensor. In view of this, when the lock determination is performed on the electric fan by use of the detection value of the current sensor as such, there is such a disadvantage that it requires much cost.

On the other hand, such an electric fan device often includes an ambient temperature sensor and a refrigerant pressure sensor as standard, so as to adjust a refrigerant pressure appropriately. In view of this, it is desirable to perform a lock determination on the electric fan by use of the ambient temperature sensor and the refrigerant pressure sensor thus included as standard.

SUMMARY OF THE INVENTION

The present invention is accomplished in view of the above problems, and provides a motor lock determination device configured to perform, without using a current sensor, a lock determination on an electric motor that drives an electric fan for cooling off refrigerant used in a cooling device.

One aspect of the present invention provides a motor lock determination device including an electric fan, an electric motor, a refrigerant pressure sensor, and an electric motor control device. The electric fan is configured to cool off refrigerant used in a predetermined cooling device. The electric motor is configured to drive the electric fan. The refrigerant pressure sensor is configured to detect a refrigerant pressure of the refrigerant. The electric motor control device is configured to detect a first detection value and a second detection value. The first detection value is a detection value of the refrigerant pressure sensor during a stop of the electric fan, and the second detection value is a detection value of the refrigerant pressure sensor after the electric fan is driven for a first predetermined time. The electric motor control device is configured to perform a lock determination on the electric motor such that when the second detection value is equal to the first detection value or more than the first detection value, the electric motor control device determines that the electric motor is locked, and when the second detection value is less than the first detection value, the electric motor control device determines that the electric motor is not locked.

According to the configuration of the motor lock determination device, the lock determination on the electric motor is performed such that: the first detection value, which is a detection value of the refrigerant pressure sensor during a stop of the electric fan, is detected, and the second detection value, which is a detection value of the refrigerant pressure sensor after the electric fan is driven for a first predetermined time, is detected, when the second detection value is the first detection value or more than the first detection value, it is, determined that a motor lock occurs, and when the second detection value is less than the first detection value, it is determined that no motor lock occurs. This makes it possible to perform the lock determination on the electric motor without using a current sensor. Hereby, it is not necessary to provide a current sensor to be used for the lock determination on the electric motor.

The motor lock determination device may further include an ambient temperature sensor configured to detect an ambient temperature, and the electric motor, control device may be configured to perform the lock determination only when a detection value of the ambient temperature sensor is a predetermined temperature or less than the predetermined temperature.

According to the configuration of the motor lock determination device, only when the detection value of the ambient temperature sensor is the predetermined temperature or less than the predetermined temperature, the lock determination is performed. Accordingly, when the predetermined temperature is set to a temperature (e.g., 0° C., or 5° C. in consideration of detection accuracy of the ambient temperature sensor) that may cause the electric motor to be locked due to freezing, it is possible to perform a lock determination with respect to the freezing lock of the electric motor 7 as the lock determination.

The motor lock determination device may further include a vehicle speed sensor configured to detect a vehicle speed of a vehicle including the motor lock determination device, and the electric motor control device may be configured to perform the lock determination only when a detection value of the vehicle speed sensor is a predetermined vehicle speed or less than the predetermined vehicle speed.

According to the configuration of the motor lock determination device, only when the detection value of the vehicle speed sensor is the predetermined vehicle speed (e.g., 5 km/h) or less than the predetermined vehicle speed, the lock determination is performed. Accordingly, only a cooling effect of the electric fan can be taken into consideration while a cooling effect of vehicle travel wind is excluded, thereby making it possible to improve determination accuracy of the lock determination.

Further, in the motor lock determination device, the electric motor control device may be configured to perform the lock determination only when a detection value of the refrigerant pressure sensor is a predetermined temperature or more than the predetermined temperature.

According to the configuration of the motor lock determination device, only when the detection value of the refrigerant pressure sensor is the predetermined refrigerant pressure (e.g., 0.5 MPa) or more than the predetermined refrigerant pressure, the lock determination is performed, thereby making it possible to perform the lock determination accurately in a state where the compressor is operated stably.

Further, in the motor lock determination device, when it is determined that the electric motor is locked, the electric motor control device may be configured to stop current application to the electric motor for a second predetermine time.

According to the configuration of the motor lock determination device, when it is determined that a motor lock occurs, the current application to the electric motor is stopped for the second predetermined time, thereby making it possible to secure a cooldown time of the electric motor, and further, to secure a time during which a locking state of the electric motor can be naturally eliminated.

Further, in the motor lock determination device, when it is determined that the electric motor is locked, the electric motor control device may be configured to perform the lock determination again after the current application to the electric motor is stopped for the second predetermine time.

According to the configuration of the motor lock determination device, when it is determined that a motor lock occurs, the lock determination is performed again after the current application to the electric motor is stopped for the second predetermined time, so that it is possible to perform the lock determination until it is determined that no motor lock occurs.

The motor lock determination device may further include a vehicle speed sensor configured to detect a vehicle speed of a vehicle including the motor lock determination device, and when a detection value of the vehicle speed sensor exceeds a predetermined vehicle speed at an end of the stop of the current application to the electric motor for the second predetermined time, the electric motor control device may be configured to continue stopping the current application to the electric motor until the detection value of the vehicle speed sensor becomes the predetermined vehicle speed or less than the predetermined vehicle speed.

According to the configuration of the motor lock determination device, when the detection value of the vehicle speed sensor exceeds the predetermined vehicle speed at the end of the stop of the current application to the electric motor for the second predetermined time, the stop of the current application to the electric motor is continued (that is, the lock determination is not performed again) until the detection value of the vehicle speed sensor becomes the predetermined vehicle speed or less than the predetermined vehicle speed. Accordingly, only the cooling effect of the electric fan can be taken into consideration while the cooling effect of vehicle travel wind is excluded, thereby making it possible to improve determination accuracy of the lock determination that is performed again.

The motor lock determination device may further include a vehicle speed sensor configured to detect a vehicle speed of a vehicle including the motor lock determination device, and when a detection value of the vehicle speed sensor exceeds a predetermined vehicle speed during the lock determination, the electric motor control device may be configured to stop the current application to the electric motor and to perform the lock determination again.

According to the configuration of the motor lock determination device, when the detection value of the vehicle speed sensor exceeds the predetermined vehicle speed during the lock determination, the current application to the electric motor is stopped and the lock determination is performed again. Accordingly, it is possible to perform the lock determination accurately while excluding the cooling effect of vehicle running wind.

Further, in the motor lock determination device, when the detection value of the vehicle speed sensor exceeds the predetermined vehicle speed during the lock determination and a determination that the electric motor is locked has never been made within one trip in the lock determinations executed so far, the electric motor control device may be configured to drive the electric fan according to a normal control while the detection value of the vehicle speed sensor exceeds the predetermined vehicle, speed.

According to the configuration of the motor lock determination device, when the detection value of the vehicle speed sensor exceeds the predetermined vehicle speed during the lock determination and a determination that a motor lock occurs has never been made within one trip in the lock determinations executed so far, the electric fan is driven according to the normal control while the detection value of the vehicle speed sensor exceeds the predetermined vehicle speed. This makes it possible to drive the electric motor according to the normal control and to perform the lock determination.

Further, in the motor lock determination device, when the detection value of the vehicle speed sensor exceeds the predetermined vehicle speed during the lock determination and a determination that the electric motor is locked has been made at least once within one trip in the lock determinations executed so far, even if the detection value of the vehicle sensor exceeds the predetermined vehicle speed, the electric motor control device may be configured not to drive the electric fan according to the normal control.

According to the configuration of the motor lock determination device, when the detection value of the vehicle speed sensor exceeds the predetermined vehicle speed during the lock determination and further a determination that a motor lock occurs has been made at least once within one trip in the lock determinations executed so far, even if the detection value of the vehicle speed sensor exceeds the predetermined vehicle speed, the electric fan is not driven according to the normal control. Thus, the normal control on the electric motor is prohibited and only the lock determination is performable.

Further, in the motor lock determination device, when the detection value of the refrigerant pressure sensor is less than a predetermined refrigerant pressure and further the determination that the electric motor is locked has never been made within one trip in the lock determinations executed so far, the electric motor control device may be configured to drive the electric fan according to the normal control while the detection value of the vehicle speed sensor exceeds the predetermined vehicle speed.

According to the configuration of the motor lock determination device, when the detection value of the refrigerant pressure sensor is less than the predetermined refrigerant pressure and further the determination that a motor lock occurs has never been made within one trip in the lock determinations executed so far, the electric fan is driven according to the normal control while the detection value of the vehicle speed sensor exceeds the predetermined vehicle speed. Accordingly, it is possible to drive the electric motor according to the normal control and to perform the lock determination.

Further, in the motor lock determination device, when the detection value of the refrigerant pressure sensor is less than a predetermined refrigerant pressure and further the determination that the electric motor is locked has been made at least once within one trip in the lock determinations executed so far, even if the detection value of the vehicle speed sensor exceeds the predetermined vehicle speed, the electric motor control device may be configured not to drive the electric fan according to the normal control.

According to the configuration of the motor lock determination device, when the detection value of the refrigerant pressure sensor is less than the predetermined refrigerant pressure and further the determination that a motor lock occurs has been made at least once within one trip in the lock determinations executed so far, even if the detection value of the vehicle speed sensor exceeds the predetermined vehicle speed, the electric fan is not driven according to the normal control. Thus, the normal control on the electric motor is prohibited and only the lock determination is performable.

According to the motor lock determination device of the present invention, it is possible to perform, without using a current sensor, a lock determination on an electric motor that drives an electric fan for cooling off refrigerant used in a cooling device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of the present invention in detail with reference to the attached drawings.

Figure 1:
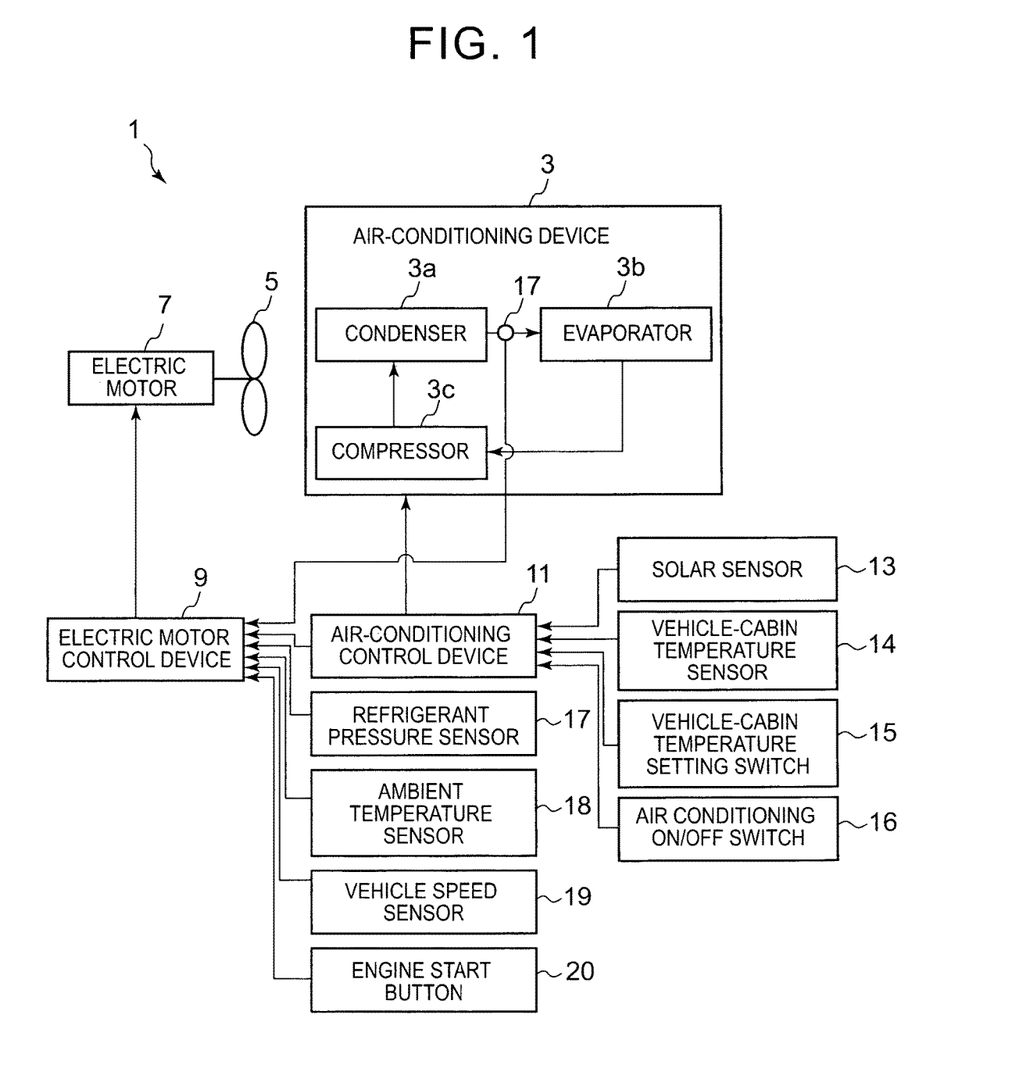
FIG. 1 is a schematic configuration, diagram illustrating a motor lock determination device according to an embodiment of the present invention.

Initially, the following describes a structure. FIG. 1 is a schematic configuration diagram illustrating a motor lock determination device according to the embodiment of the present invention.

A motor lock determination device 1 according to the present embodiment is configured to perform a lock determination (herein, a freezing lock determination) on an electric motor 7 that drives an electric fan 5 for cooling off refrigerant used in a cooling device (herein, an air-conditioning device 3) provided in a vehicle or the like. The motor lock determination device 1 has such a feature that a motor lock determination is performed by use of a refrigerant pressure of the refrigerant (that is, without using a current sensor that detects a current flowing in the electric motor 7). The following describes the motor lock determination device 1 in detail with reference to FIG. 1.

As illustrated in FIG. 1, the motor lock determination device 1 includes the air-conditioning device 3, the refrigerant-cooling electric fan 5 (hereinafter just referred to as the electric fan), the electric motor 7, an electric motor control device 9, and an air-conditioning control device 11. The air-conditioning device 3 is one example of a cooling device provided in a vehicle or the like. The electric fan 5 cools off refrigerant used in the air-conditioning device 3. The electric motor 7 drives the electric fan 5. The electric motor control device 9 controls the electric motor 7. The air-conditioning control device 11 controls the air-conditioning device 3 via the electric motor control device 9.

The air-conditioning device 3 adjusts a temperature of air in a vehicle compartment by use of refrigerant (e.g., carbon dioxide, chlorofluorocarbon, or the like). The air-conditioning device 3 includes a condenser 3a, an evaporator 3b, a compressor 3c, an air-conditioning electric fan (not shown), and an air-conditioning electric motor (not shown). The condenser 3a cools off the refrigerant so as to liquefy the refrigerant. The evaporator 3b vaporizes the refrigerant thus liquefied by the condenser 3a, so as to cool off the air. The compressor 3c performs adiabatic compression on the refrigerant thus vaporized by the evaporator 3b, so as to supply the refrigerant to the condenser 3a. The air-conditioning electric fan sends the air thus cooled off by the evaporator 3b as air-conditioning blowing air, through an air outlet in the vehicle compartment. The air-conditioning electric motor drives the air-conditioning electric fan.

The condenser 3a cools off the refrigerant by air sent from the electric fan 5. Because of this, a refrigerant cooling capacity of the condenser 3a is controllable by a rotation speed of the electric fan 5. The compressor 3c and the air-conditioning electric motor are drive-controlled according to controls by the air-conditioning control device 11.

In the air-conditioning device 3, when the compressor 3c and the air-conditioning electric motor are driven according to the controls by the air-conditioning control device 11, a refrigeration cycle in which the refrigerant circulates in order of the condenser 3a, the evaporator 3b, the compressor 3c, and the condenser 3a is operated. Then, when the electric fan 5 is rotationally driven according to a control by the electric motor control device 9, a refrigerant cooling action of the condenser 3a is demonstrated, so that a temperature of the air-conditioning blowing air is adjusted.

To the air-conditioning control device 11, for example, a solar sensor 13, a vehicle-cabin temperature sensor 14, a vehicle-cabin temperature setting switch 15, and an air conditioning on/off switch 16 are connected. The solar sensor 13 is a sensor that detects an amount of solar radiation in the vehicle compartment. The vehicle-cabin temperature sensor 14 is a sensor that detects a temperature in the vehicle compartment. The vehicle-cabin temperature setting switch 15 is a switch to perform an input operation of a vehicle-cabin temperature. The air conditioning on/off switch 16 is a switch to perform an on/off operation on the air-conditioning device 3.

Based on the on/off operation on the air conditioning on/off switch 16, the air-conditioning control device 11 operates/stops the compressor 3c and the air-conditioning electric motor and operates/stops the refrigeration cycle in the air-conditioning device 3. Subsequently, based on respective detection values of the solar sensor 13 and the vehicle-cabin temperature sensor 14 and a preset temperature input into the vehicle-cabin temperature setting switch 15, the air-conditioning control device 11 calculates a temperature (an air-conditioning blowing air requested temperature) necessary for the air-conditioning blowing air to adjust the temperature in the vehicle compartment to the preset temperature thus input into the vehicle-cabin temperature setting switch 15, and then outputs the air-conditioning blowing air requested temperature to the electric motor control device 9.

Further, when the on/of operation is performed on the air conditioning on/off switch 16, the air-conditioning control device 11 outputs an output value of the on/off operation to the electric motor control device 9.

The electric fan 5 cools off the condenser 3a by sending air thereto. The electric motor 7 rotationally drives the electric fan 5, and the electric motor 7 is driven by a predetermined battery (not shown) provided in the vehicle as a power source, for example.

In addition to the air-conditioning control device 11, a refrigerant pressure sensor 17, an ambient temperature sensor 18, a vehicle speed sensor 19, and an engine start button 20 are also connected to the electric motor control device 9. The refrigerant pressure sensor 17 is a sensor for detecting a refrigerant pressure of the refrigerant used in the air-conditioning device 3 (e.g., a refrigerant pressure of the refrigerant that flows between the condenser 3a and the evaporator 3b). The ambient temperature sensor 18 is a sensor for detecting a temperature (an ambient temperature) around the electric motor 7. The vehicle speed sensor 19 is a sensor for detecting a vehicle speed of the vehicle. The engine start button 20 is a button for switching start/stop of an engine (not shown) provided in the vehicle, according to its on/off operation.

The electric motor control device 9 performs a current-application control on the electric motor 7 based on the air-conditioning blowing air requested temperature from the air-conditioning control device 11, so as to drive-control the electric fan 5, as a normal control (that is, a control on the electric motor 7 in a normal time (at the time when it is determined that no motor lock occurs)). For example, in a case where only a switching control between driving/stop is performable on the electric motor 7, the electric motor control device 9 performs driving/current-application stop on the electric motor 7 based on whether or not there is a reception of the air-conditioning blowing air requested temperature from the air-conditioning control device 11. Further, in a case where a rotation speed of the electric motor 7 is freely controllable, the electric motor control device 9 controls the rotation speed of the electric motor 7 so that a temperature of the air-conditioning blowing air achieves the air-conditioning blowing air requested temperature.

Further, the electric motor control device 9 performs a freezing lock determination on the electric motor 7 before execution of the normal control, as will be described later. In a case where it is determined that, no motor lock occurs, the electric motor control device 9 controls the electric motor 7 according to the normal control, and in a case where it is determined that a motor lock occurs, the electric motor control device 9 stops current application to the electric motor 7. The stop of the current application prevents the electric motor 7 or the electric fan 5 from being damaged. Note that the freezing lock determination is a determination on whether or not the electric motor 7 is locked due to freezing.

More specifically, when the engine and the air-conditioning device 3 are both operated, the electric motor control device 9 initially performs a determination on whether or not start conditions of the freezing lock determination are established. Note that the operation of the engine is determined based on an output value from, the engine start button 20. The operation of the air-conditioning device 3 is determined based on that output value of the air conditioning on/off switch 16 which is output from the air-conditioning control device 11.

That is, the electric motor control device 9 performs, for the start conditions of the freezing lock determination, a determination (a first determination) on whether or not a detection value (that is, an ambient temperature) Tout of the ambient temperature sensor 18 is a predetermined temperature (e.g., 5° C.) Ts or less than the predetermined temperature, and a determination (a second determination) on whether or not a detection value (that is, a vehicle speed) V of the vehicle speed sensor 19 is a predetermined vehicle speed (e.g., 5 km/h) Vs or less. In a case of Yes in both of the determinations, the electric motor control device 9 further performs a determination (a third determination) on whether or not a detection value (that is, a refrigerant pressure) P of the refrigerant pressure sensor 17 is a predetermined refrigerant pressure (e.g., 0.5 MPa) Ps or more than the predetermined refrigerant pressure. Then, in a case of Yes in all of the first to third determinations, the electric motor control device 9 determines that the start conditions of the freezing lock determination are established, and performs the freezing lock determination.

Note that, in the first determination, it is determined whether or not the ambient temperature Tout is an ambient temperature (a temperature not more than the predetermined temperature Ts) that may cause a freezing lock. The predetermined temperature Ts may be set to a temperature of not more than 0° C. that may cause a freezing lock, or a temperature of not more than 5° C. in consideration of detection accuracy of the ambient temperature sensor 18.

In the second determination, it is determined whether or not the vehicle speed V is a vehicle speed (a vehicle speed not more than the predetermined vehicle speed Vs) at which vehicle travel wind does not affect the freezing lock determination. The predetermined vehicle speed Vs is set, for example, to 5 km/h, but may be set to 0 km/h. In this case (Vs=0 km/h), the freezing lock determination is performed during vehicle idling.

In the third determination, it is determined whether or not the refrigerant pressure P is a refrigerant pressure (a refrigerant pressure not less than the predetermined refrigerant pressure Ps) that stabilizes an operation of the compressor 3c.

In a case of No in the first determination (that is, Tout>Ts), the ambient temperature is an ambient temperature that does not cause freezing lock, so that the electric motor control device 9 determines that no motor lock occurs, and controls the electric motor 7 according to the normal control. Further, in a case of Yes in the first determination (that is, Tout≤Ts) and further in a case of No in the second determination (that is, V>Vs), the electric motor control device 9 temporarily controls the electric motor 7 according to the normal control, and waits until the detection value V of the vehicle speed sensor 19 becomes the predetermined vehicle speed Vs or less (that is, the electric motor control device 9 waits for an execution timing of the freezing lock determination).

Further, in a case of No in the third determination (that is, P<Ps) and further in a case (a1) where a determination that a motor lock occurs has never been made within one trip in the freezing lock determinations executed so far, the electric motor control device 9 returns to the execution of the second determination. Hereby, in this case, while the detection value V of the vehicle speed sensor 19 exceeds the predetermined vehicle speed Vs, the electric motor 7 is temporarily controllable according to the normal control (that is, in a case where it is not confirmed that the electric motor 7 is locked due to freezing, the electric motor 7 is controllable according to the normal control).

On the other hand, in a case (a2) where the determination that a motor lock occurs has been made at least once within one trip in the freezing lock determinations executed so far, the electric motor control device 9 returns to the execution of the third determination. Hereby, in this case, even if the detection value V of the vehicle speed sensor 19 exceeds the predetermined vehicle speed Vs, the electric motor 7 is not controlled according to the normal control (that is, the normal control on the electric motor 7 is prohibited during the freezing lock of the electric motor 7).

The electric motor control device 9 performs the freezing lock determination such that: the electric motor control device 9 detects a detection value (a first detection value) P1 of the refrigerant pressure sensor 17 during a stop of the electric fan 5 (that is, during a stop of current application to the electric motor 7), and detects a detection value (a second detection value) P2 of the refrigerant pressure sensor 17 after the electric fan 5 (that is, the electric motor 7) is driven for a first predetermined time (a freezing determination duration time, e.g., 30 seconds) Δt1, and performs comparison in size between the first detection value P1 and the second detection value P2.

As a result of the freezing lock determination, in a case where the second detection value P2 is less than the first detection value P1 (P2<P1), it is considered that the second detection value P2 becomes less than the first detection value P1 due to a cooling effect of the electric fan 5, so that the electric motor control device 9 determines that no motor lock occurs, and controls the electric motor 7 according to the normal control.

Further, as a result of the freezing lock determination, in a case where the second detection value P2 is not less than the first detection value P1 (P2≥P1), even if the electric motor 7 (that is, the electric fan 5) is driven, the second detection value P2 does not become less than the first detection value P1. Accordingly, the electric motor control device 9 determines that a motor lock occurs, and stops the current application to the electric motor 7 for a second predetermined time (a motor cooldown time, e.g., 60 seconds) Δt2.

At the end of the stop of the current application for the second predetermined time Δt2, in a case where the detection value V of the vehicle speed sensor 19 is not more than the predetermined vehicle speed Vs, the electric motor control device 9 returns to the execution of the third determination, so that the electric motor control device 9 waits for the execution timing of the freezing lock determination and performs the freezing lock determination again, as described above. In the meantime, at the end of the stop of the current application for the second predetermined time Δt2, in a case where the detection value V of the vehicle speed sensor 19 exceeds the predetermined vehicle speed Vs, the electric motor control device 9 continues stopping the current application to the electric motor 7 until the detection value V of the vehicle speed sensor 19 becomes the predetermined vehicle speed Vs or less. After that, the electric motor control device 9 returns to the execution of the third determination, so that the electric motor control device 9 waits for the execution timing of the freezing lock determination and performs the freezing lock determination again, as described above. Thus, every time it is determined that a freezing lock occurs in the freezing lock determination, the freezing lock determination is performed again.

Note that, in a case where the detection value V of the vehicle speed sensor 19 exceeds the vehicle speed Vs during the freezing lock determination (e.g., during driving of the electric fan 5 for the first predetermined time Δt1) and further in a case (b1) where a determination that a motor lock occurs has never been made within one trip in the freezing lock determinations executed so far, the electric motor control device 9 stops the current application to the electric motor 7 and terminates the freezing lock determination. Then, the electric motor control device 9 returns to the execution of the second determination, so that the electric motor control device 9 waits for the execution timing of the freezing lock determination and performs the freezing lock determination again, as described above. Hereby, in this case, while the detection value V of the vehicle speed sensor 19 exceeds the predetermined vehicle speed Vs, the electric fan 5 is temporarily controllable according to the normal control (that is, in a case where it is not confirmed that the electric motor 7 is locked due to freezing, the electric motor 7 is controllable according to the normal control).

On the other hand, in a case (b2) where the determination that a motor lock occurs has been made at least once within one trip in the freezing lock determinations executed so far, the electric motor control device 9 stops the current application to the electric motor 7 and terminates the freezing lock determination. Then, the electric motor control device 9 returns to the execution of the third determination, so that the electric motor control device 9 waits for the execution timing of the freezing lock determination and performs the freezing lock determination again, as described above. Hereby, in this case, even if the detection value V of the vehicle speed sensor 19 exceeds the predetermined vehicle speed Vs, the electric fan 5 is not controlled according to the normal control (that is, the normal control on the electric motor 7 is prohibited during the freezing lock of the electric motor 7).

Figure 2:
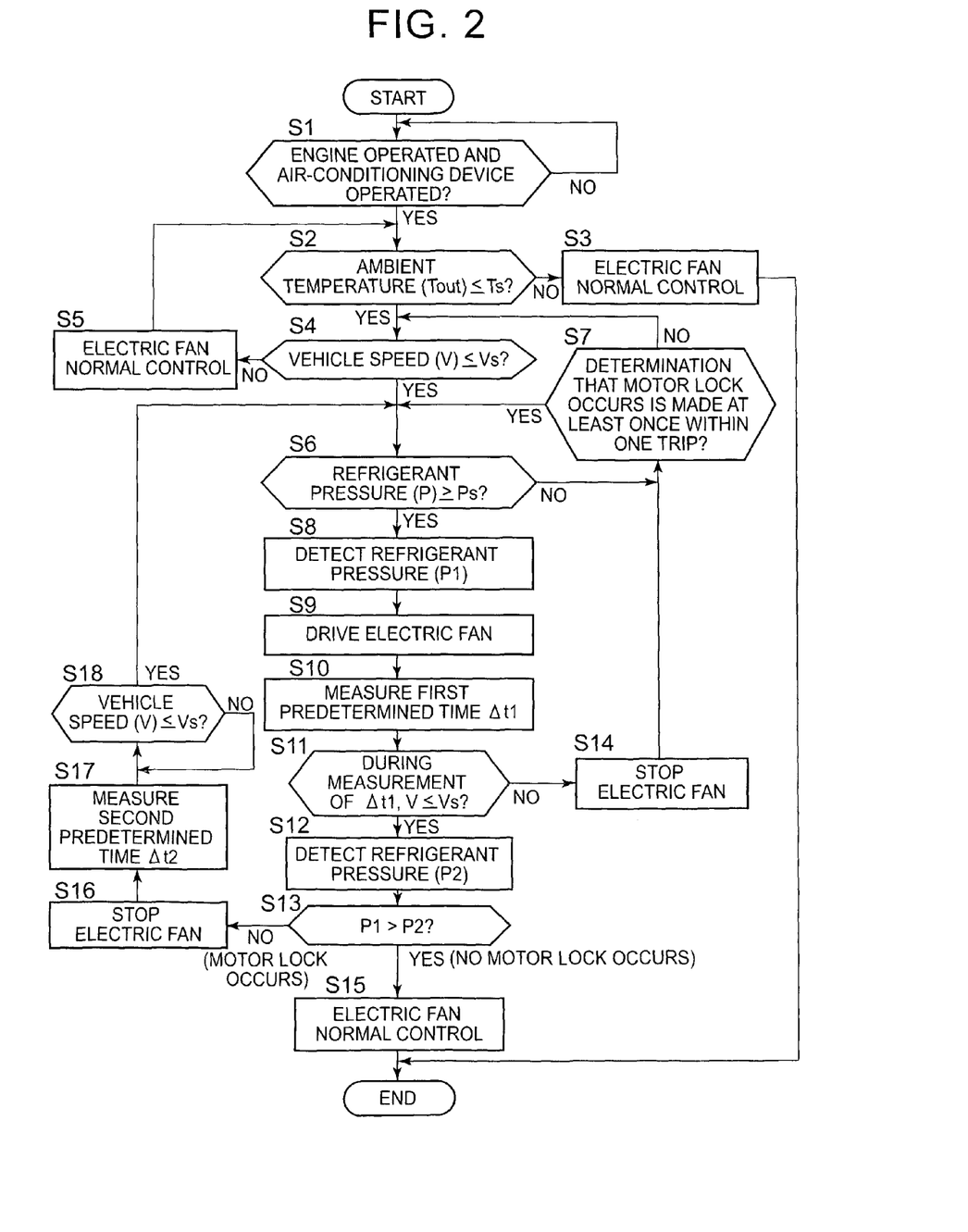
FIG. 2 is a flow chart illustrating an operation of an essential part, of the motor lock determination device according to the embodiment of the present invention.

Next will be described an operation of an essential part (that is, the electric motor control device 9) of the motor lock determination device 1, with reference to FIG. 2. FIG. 2 is a flow chart to describe the operation of the essential part of the motor lock determination device according to the present embodiment. Note that, in the following operation, a series of operations from step S1 to an end of a process is one trip, for example.

In step S1, the electric motor control device 9 determines whether or not the engine is operated, based on an output value from the engine start button 20. Further, the electric motor control device 9 determines whether or not the air-conditioning device 3 is operated, based on that output value of the air conditioning on/off switch 16 which is output from the air-conditioning control device 11.

As a result of these determinations; in a case where the engine and the air-conditioning device 3 are both operated, it is determined whether or not the ambient temperature Tout and the vehicle speed V satisfy the start conditions of the freezing lock determination, in steps S2, S4. In a case of Yes in both of the determinations, it is further determined whether or not the refrigerant pressure P satisfies the start condition of the freezing lock determination, in step S6. In a case of Yes in the determination, the freezing lock determination is performed in steps S8 to S13.

More specifically, in step S2, the electric motor control device 9 determines whether or not the detection value Tout of the ambient temperature sensor 18 is the predetermined temperature (e.g., 5° C.) Ts or less. In a case of No in this determination (that is, Tout>Ts), the ambient temperature is not an ambient temperature that causes freezing lock, so that the electric motor control device 9 determines that no motor lock occurs. Then, the process proceeds to step S3, and the electric motor control device 9 controls the electric motor 7 according to the normal control. Then, the process is finished.

On the other hand, in a case of Yes (that is, Tout≤Ts) in the determination in step S2, the process proceeds to step S4, so that the electric motor control device 9 determines whether or not the detection value V of the vehicle speed sensor 19 is the predetermined vehicle speed (e.g., 5 km/h) Vs or less.

In a case of No (that is, V>Vs) in the determination in step S4, the process proceeds to step S5, so that the electric motor control device 9 controls the electric motor 7 according to the normal control. Then, the process returns to step S2, and the process is repeated in order of steps S2, S4, S5, and S2 (note that, since the ambient temperature Tout does not change suddenly, the process rarely proceeds in order of step S2, step S3, and END, in this case). Hereby, the electric motor control device 9 temporarily controls the electric motor 7 according to the normal control until the vehicle speed V becomes the predetermined vehicle speed Vs or less.

On the other hand, in a case of Yes (that is, V≤Vs) in the determination in step S4, the process proceeds to step S6, so that the electric motor control device 9 determines whether or not the detection value P of the refrigerant pressure sensor 17 is the predetermined refrigerant pressure (e.g., 0.5 MPa) Ps or more than the predetermined refrigerant pressure. In a case of No (that is, P<Ps) in this determination, the process proceeds to step S7 to wait for the execution timing of the freezing lock determination. On the other hand, in a case of Yes (that is, P≥Ps) in this determination, the process proceeds to steps S8 to S13 sequentially, so that the freezing lock determination is performed.

More specifically, in step S7, the electric motor control device 9 determines whether or not a determination that a motor lock occurs has been made at least once within one trip in the freezing lock determinations executed so far. In a case of Yes in this determination (that is, in a case where the determination that a motor lock occurs has been made at least once within one trip), the process returns to step S6. Hereby, in this case, even if the detection value V of the vehicle speed sensor 19 exceeds the predetermined vehicle speed Vs, the electric motor control device 9 does not control the electric fan 5 according to the normal control, and waits for the execution timing of the freezing lock determination until the detection value P of the refrigerant pressure sensor 17 becomes the predetermined refrigerant pressure Ps or more than the predetermined refrigerant pressure Ps.

On the other hand, in a case of No in the determination in step S7 (that is, in a case where the determination that a motor lock occurs has never been made within one trip), the process returns to step S4. Hereby, in this case, while the detection value V of the vehicle speed sensor 19 exceeds the predetermined vehicle speed Vs in the determination in step S4 (that is, until the detection value V of the vehicle speed sensor 19 becomes the predetermined vehicle speed Vs or less), the electric motor control device 9 temporarily controls the electric fan 5 according to the normal control, and waits for the execution timing of the freezing lock determination.

In step S8, the electric motor control device 9 detects a current detection value P1 of the refrigerant pressure sensor 17 P1 (that is, a detection value of the refrigerant pressure sensor 17 during a stop of the electric fan 5 (that is, the electric motor 7)) (the first detection value). Then, in step S9, after detecting the first detection value P1, the electric motor control device 9 starts driving the electric fan 5 (that is, the electric motor 7). In step S10, the electric motor control device 9 measures the first predetermined time (the freezing determination duration time) Δt1 from the driving start in step S9. In step S11, concurrently with the time measurement in step S10, the electric motor control device 9 determines whether or not the detection value V of the vehicle speed sensor 19 is the predetermined vehicle speed Vs or less (that is, during the time measurement in step S10, it is determined whether or not the detection value V of the vehicle speed sensor 19 is the predetermined vehicle speed Vs or less).

In a case of No (that is, V>Vs) in the determination in step S11, the process proceeds to step S14, so that the electric motor control device 9 stops the electric fan 5 (that is, the electric motor 7), so as to terminate the freezing lock determination. Then, the process returns to step S7, so that the electric motor control device 9 waits for the execution timing of the freezing lock determination, and the freezing lock determination is performed again, as described above.

On the other hand, in a case of Yes (that is, V≤Vs) in the determination in step S11, the process proceeds to step S12, so that the electric motor control device 9 detects a detection value (the second detection value) of the refrigerant pressure sensor 17 after the first predetermined time Δt1 has passed. Then, in step S13, the electric motor control device 9 performs comparison in size between the first detection value P1 and the second detection value P2.

As a result of the comparison in size in step S13, in a case where the second detection value P2 is less than the first detection value P1 (that is, P2<P1), the electric motor control device 9 determines that no motor lock occurs. In this case, the process proceeds to step S15, so that the electric motor control device 9 controls the electric motor 7 according to the normal control. Then, the process is finished.

On the other hand, as a result of the comparison in size in step S13, in a case where the second detection value P2 is not less than the first detection value P1 (that is, P2≥P1), the electric motor control device 9 determines that a motor lock occurs. In this case, the process proceeds to step S16, so that the electric motor control device 9 stops the electric fan 5 (that is, the electric motor 7). Then, the process proceeds to step S17, so that the electric motor control device 9 measures the second predetermined time (the motor cooldown time) Δt2 from the stop in step S16 (that is, the electric fan 5 is stopped for the second predetermined time Δt2). Subsequently, the process proceeds to step S18, so that the electric motor control device 9 determines whether or not the detection value V of the vehicle speed sensor 19 is the predetermined vehicle speed Vs or less after the time measurement in step S17 is completed.

In a case of No (that is, V>Vs) in the determination in step S18, the electric, motor control device 9 continues stopping the electric fan 5 until the detection value V of the vehicle speed sensor 19 becomes the predetermined vehicle speed Vs or less. On the other hand, in a case of Yes (that is, V≤Vs) in the determination in step S18, the process returns to step S6, so that the electric motor control device 9 repeats the abovementioned process and performs the freezing lock determination again. Hereby, every time it is determined that a motor lock occurs in step S13, the freezing lock determination is repeated again.

The following describes main effects. According to the motor lock determination device 1 configured as described above, as the lock determination (here, the freezing lock determination) on the electric motor 7, the first detection value P1, which is a detection value P of the refrigerant pressure sensor 17 during the stop of the electric fan 5, is detected, and the second detection value P2, which is a detection value P of the refrigerant pressure sensor 17 after the electric fan 5 has been driven for the first predetermined time Δt1, is detected. In a case where the second detection value P2 is the first detection value P1 or more than the first detection value P1, it is determined that a motor lock occurs. In a case where the second detection value P2 is less than the first detection value P1, it is determined that no motor lock occurs. This makes it possible to perform the lock determination on the electric motor 7 without using a current sensor. Hereby, it is not necessary to provide a current sensor to be used for the lock determination on the electric motor 7.

Further, only in a case where the detection value Tout of the ambient temperature sensor 18 is the predetermined temperature is or less, the lock determination is performed. Accordingly, when the predetermined temperature Ts is set to a temperature (e.g., 0° C., or 5° C. in consideration of detection accuracy of the sensor) that may cause the electric motor 7 to be locked due to freezing, a lock determination with respect to the freezing lock of the electric motor 7 is performable as the lock determination.

Further, only in a case where the detection value V of the vehicle speed sensor 19 is the predetermined vehicle speed (e.g., 5 km/h) Vs or less, the lock determination is performed. Accordingly, only the cooling effect of the electric fan 5 can be taken into consideration while a cooling effect of vehicle travel wind is excluded, thereby making it possible to improve determination accuracy of the lock determination.

Further, only in a case where the refrigerant pressure P of the refrigerant pressure sensor 17 is the predetermined refrigerant pressure (e.g., 0.5 MPa) Ps or more than the predetermined refrigerant pressure, the lock determination is performed, thereby making it possible to perform the lock determination accurately in a state where the compressor 3c is operated stably.

Further, in a case where it is determined that a motor lock occurs, the current application to the electric motor 7 is stopped for the second predetermined time $\Delta t2$, thereby making it possible to secure a cooldown time of the electric motor 7, and further, to secure a time during which a locking state of the electric motor 7 can be naturally eliminated.

Further, in a case where it is determined that a motor lock occurs, the lock determination is performed again after the current application to the electric motor 7 is stopped for the second predetermined time $\Delta t2$, so that it is possible to perform the lock determination until it is determined that no motor lock occurs.

Further, in a case where the detection value V of the vehicle speed sensor 19 exceeds the predetermined vehicle speed Vs at the end of the stop of the current application to the electric motor 7 for the second predetermined time $\Delta t2$, the stop of the current application to the electric motor 7 is continued (that is, the lock determination is not performed again) until the detection value V of the vehicle speed sensor 19 becomes the predetermined vehicle speed Vs or less. On that account, only the cooling effect of the electric fan 5 can be taken into consideration while the cooling effect of vehicle travel wind is excluded, thereby making it possible to improve determination accuracy of the lock determination that is performed again.

Further, in a case where the detection value V of the vehicle speed sensor 19 exceeds the vehicle speed Vs (that is, the cooling effect of vehicle running wind affects the lock determination) during the lock determination (e.g., while the first predetermined time $\Delta t1$ is measured); the current application to the electric motor 7 is stopped and the lock determination is performed again. Accordingly, it is possible to perform the lock determination accurately by excluding the cooling effect of vehicle running wind.

Further, in a case where the detection value V of the vehicle speed sensor 19 exceeds the predetermined vehicle speed Vs during the lock determination, and further a determination that a motor lock occurs has never been made within one trip in the lock determinations executed so far, the electric fan 5 is controlled according to the normal control while the detection value V of the vehicle speed sensor 19 exceeds the predetermined vehicle speed Vs. This makes it possible to control the electric motor 7 according to the normal control and to perform the lock determination.

Further, in a case, where the detection value V of the vehicle speed sensor 19 exceeds the predetermined vehicle speed Vs during the lock determination and further the determination that a motor lock occurs has been made at least once within one trip in the lock determinations executed so far, even if the detection value V of the vehicle speed sensor 19 exceeds the predetermined vehicle speed Vs, the electric fan 5 is not controlled according to the normal control. Thus, the normal control on the electric motor 7 is prohibited and only the lock determination is performable.

Further, in a case where the detection value P of the refrigerant pressure sensor 17 is less than the predetermined refrigerant pressure Ps and further the determination that a motor lock occurs has never been made within one trip in the lock determinations executed so far, the electric fan 5 is temporarily controlled according to the normal control while the detection value V of the vehicle speed sensor 19 exceeds the predetermined vehicle speed Vs. Thus, the electric motor 7 is controllable according to the normal control and the lock determination is also performable.

Further, in a case where the detection value P of the refrigerant pressure sensor 17 is less than the predetermined refrigerant pressure Ps and further the determination that a motor lock occurs has been made at least once within one trip in the lock determinations executed so far, even if the detection value V of the vehicle speed sensor 19 exceeds the predetermined vehicle speed Vs, the electric fan 5 is not controlled according to the normal control. Thus, the normal control on the electric motor 7 is prohibited and only the lock determination is performable.

Note that, in this embodiment, it is determined whether or not the ambient temperature Tout, the vehicle speed V, and the refrigerant pressure P satisfy respective predetermined conditions as the lock determination start conditions. However, only one or two of them may be used as the lock determination start conditions. Further, all the lock determination start conditions may not be used.

Further, in this embodiment, the freezing lock determination is performed as the lock determination. However, the lock determination may be performed only in a case where the ambient temperature Tout exceeds the predetermined temperature Ts, so that it is possible to perform a foreign-substance lock determination (a lock determination with respect to a lock of the electric motor 7 caused by foreign substances) as the lock determination.

The present invention is suitably applied to a motor lock determination device configured to perform a lock determination on an electric motor that drives an electric fan for cooling off refrigerant used in a cooling device provided in a vehicle or the like.

The invention claimed is:

1. A motor lock determination device comprising:
an electric fan configured to cool off refrigerant used in a predetermined cooling device;
an electric motor configured to drive the electric fan;
a refrigerant pressure sensor configured to detect a refrigerant pressure of the refrigerant; and
an electric motor controller configured to detect a first detection value and a second detection value, the first detection value being a detection value of the refrigerant pressure sensor during a stop of the electric fan, the second detection value being a detection value of the refrigerant pressure sensor after the electric fan is driven for a first predetermined time, and the electric motor controller being configured to perform a lock determination on the electric motor such that when the second detection value is equal to the first detection value or more than the first detection value, the electric motor controller determines that the electric motor is locked, and when the second detection value is less than the first detection value, the electric motor controller determines that the electric motor is not locked, wherein the electric motor controller is configured to perform the lock determination only when the detection value of the refrigerant pressure sensor is a predetermined refrigerant pressure or more than the predetermined refrigerant pressure.

2. The motor lock determination device according to claim 1, further comprising:

an ambient temperature sensor configured to detect an ambient temperature.

3. A motor lock determination device comprising:

an electric fan configured to cool off refrigerant used in a predetermined cooling device;

an electric motor configured to drive the electric fan;

a refrigerant pressure sensor configured to detect a refrigerant pressure of the refrigerant;

an electric motor controller configured to detect a first detection value and a second detection value, the first detection value being a detection value of the refrigerant pressure sensor during a stop of the electric fan, the second detection value being a detection value of the refrigerant pressure sensor after the electric fan is driven for a first predetermined time, and the electric motor controller being configured to perform a lock determination on the electric motor such that when the second detection value is equal to the first detection value or more than the first detection value, the electric motor controller determines that the electric motor is locked, and when the second detection value is less than the first detection value, the electric motor controller determines that the electric motor is not locked; and a vehicle speed sensor configured to detect a vehicle speed of a vehicle including the motor lock determination device, wherein:

the electric motor controller is configured to perform the lock determination only when a detection value of the vehicle speed sensor is a predetermined vehicle speed or less than the predetermined vehicle speed.

4. The motor lock determination device according to claim 3, wherein:

when it is determined that the electric motor is locked, the electric motor controller is configured to stop current application to the electric motor for a second predetermined time.

5. The motor lock determination device according to claim 4, wherein:

when it is determined that the electric motor is locked, the electric motor controller is configured to perform the lock determination again after the current application to the electric motor is stopped for the second predetermined time.

6. The motor lock determination device according to claim 5, wherein:

when the detection value of the vehicle speed sensor exceeds the predetermined vehicle speed at an end of the stop of the current application to the electric motor for the second predetermined time, the electric motor controller is configured to continue stopping the current application to the electric motor until the detection value of the vehicle speed sensor becomes the predetermined vehicle speed or less than the predetermined vehicle speed.

7. The motor lock determination device according to claim 3, wherein:

when the detection value of the vehicle speed sensor exceeds the predetermined vehicle speed during the lock determination, the electric motor controller is configured to stop current application to the electric motor and to perform the lock determination again.

8. The motor lock determination device according to claim 1, wherein:

when it is determined that the electric motor is locked, the electric motor controller is configured to stop current application to the electric motor for a second predetermined time.

9. The motor lock determination device according to claim 8, wherein:

when it is determined that the electric motor is locked, the electric motor controller is configured to perform the lock determination again after the current application to the electric motor is stopped for the second predetermined time.

10. The motor lock determination device according to claim 9, further comprising:

a vehicle speed sensor configured to detect a vehicle speed of a vehicle including the motor lock determination device, wherein:

when a detection value of the vehicle speed sensor exceeds a predetermined vehicle speed at an end of the stop of the current application to the electric motor for the second predetermined time, the electric motor controller is configured to continue stopping the current application to the electric motor until the detection value of the vehicle speed sensor becomes the predetermined vehicle speed or less than the predetermined vehicle speed.

11. The motor lock determination device according to claim 10, wherein:

when the detection value of the vehicle speed sensor exceeds the predetermined vehicle speed during the lock determination, the electric motor controller is configured to stop the current application to the electric motor and to perform the lock determination again.

12. The motor lock determination device according to claim 1, further comprising:

a vehicle speed sensor configured to detect a vehicle speed of a vehicle including the motor lock determination device, wherein:

when a detection value of the vehicle speed sensor exceeds a predetermined vehicle speed during the lock determination, the electric motor controller is configured to stop current application to the electric motor and to perform the lock determination again.

13. The motor lock determination device according to claim 11, wherein:

when the detection value of the vehicle speed sensor exceeds the predetermined vehicle speed during the lock determination and a determination that the electric motor is locked has never been made within one trip in the lock determinations executed so far, the electric motor controller is configured to drive the electric fan according to a normal control while the detection value of the vehicle speed sensor exceeds the predetermined vehicle speed.

14. The motor lock determination device according to claim 12, wherein:

when the detection value of the vehicle speed sensor exceeds the predetermined vehicle speed during the lock determination and a determination that the electric motor is locked has been made at least once within one trip in the lock determinations executed so far, even if the detection value of the vehicle speed sensor exceeds the predetermined vehicle speed, the electric motor controller is configured not to drive the electric fan according to a normal control.

15. The motor lock determination device according to claim 1, wherein:

when the detection value of the refrigerant pressure sensor is less than a predetermined refrigerant pressure and further the determination that the electric motor is locked has never been made within one trip in the lock determinations executed so far, the electric motor controller is configured to drive the electric fan according to a normal control while the detection value of a vehicle speed sensor exceeds a predetermined vehicle speed.

16. The motor lock determination device according to claim 1, wherein:

when the detection value of the refrigerant pressure sensor is less than a predetermined refrigerant pressure and further the determination that the electric motor is locked has been made at least once within one trip in the lock determinations executed so far, even if the detection value of a vehicle speed sensor exceeds a predetermined vehicle speed, the electric motor controller is configured not to drive the electric fan according to a normal control.

* * * * *